United States Patent [19]

Kahnke

[11] Patent Number: 4,462,262
[45] Date of Patent: Jul. 31, 1984

[54] FLUID FLOW SENSING SYSTEM
[75] Inventor: Joseph Kahnke, St. Paul, Minn.
[73] Assignee: Honeywell Inc., Minneapolis, Minn.
[21] Appl. No.: 363,981
[22] Filed: Mar. 31, 1982
[51] Int. Cl.³ .............................................. G01F 1/70
[52] U.S. Cl. ............................ 73/861.05; 324/61 QS
[58] Field of Search ............... 73/861.05, 861.32, 255, 73/253; 324/71.4, 61 QS; 377/12, 21; 361/285; 340/562, 674

[56] References Cited
U.S. PATENT DOCUMENTS

| | | | |
|---|---|---|---|
| 2,288,838 | 7/1942 | Pike et al. | 340/870.31 X |
| 2,349,992 | 5/1944 | Schrader | 324/71.4 X |
| 3,385,311 | 5/1968 | Arutjunov et al. | |
| 3,444,322 | 5/1969 | Shonin et al. | |
| 3,862,100 | 1/1975 | Griverus | |
| 4,089,220 | 5/1978 | Houlberg | |
| 4,157,660 | 6/1979 | Spacek | 73/861.05 |
| 4,164,866 | 8/1979 | Mitchell et al. | 73/861.77 |
| 4,183,060 | 1/1980 | Barnette et al. | 324/61 QS X |
| 4,331,036 | 5/1982 | Severson et al. | 73/861.05 |
| 4,343,191 | 8/1982 | Cairenius | 73/861.05 |
| 4,404,860 | 9/1983 | Wood et al. | 73/861.78 |

FOREIGN PATENT DOCUMENTS 1439598  6/1976  United Kingdom ............ 73/861.32

Primary Examiner—Herbert Goldstein
Assistant Examiner—Brian R. Tumm
Attorney, Agent, or Firm—Charles G. Mersereau

[57] ABSTRACT

A system for detecting changes in the electrical conductivity or capacitance of a fluid occasioned by the passage of a follower element is disclosed which includes a hollow fluid passage such as a flowmeter through which a fluid is caused to pass and is provided with at least one follower element of similar cross sectional shape to that of the passage and of a size slightly smaller than the passage which is free to move along the passage and has electrical conductance or capacitance properties substantially different from the fluid. At least one electrically-conductive sensor is disposed in the passage in electrical communication with the fluid. A detector circuit is utilized to sense changes in conductance or capacitance through said fluid in accordance with the presence of said follower element in the conductive path.

3 Claims, 5 Drawing Figures

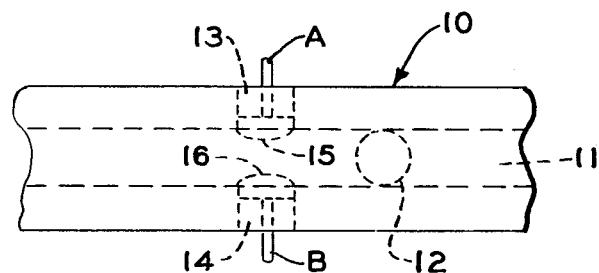
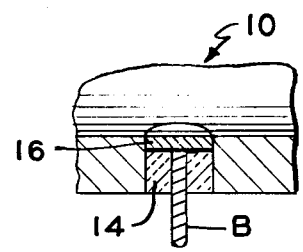
FIG. 1A  FIG. 1B
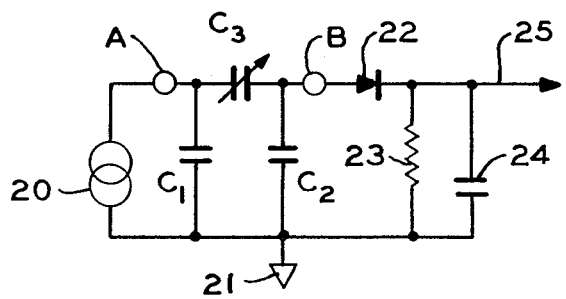
FIG. 2
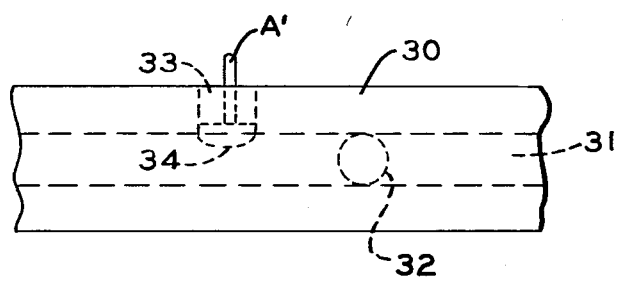
FIG. 3
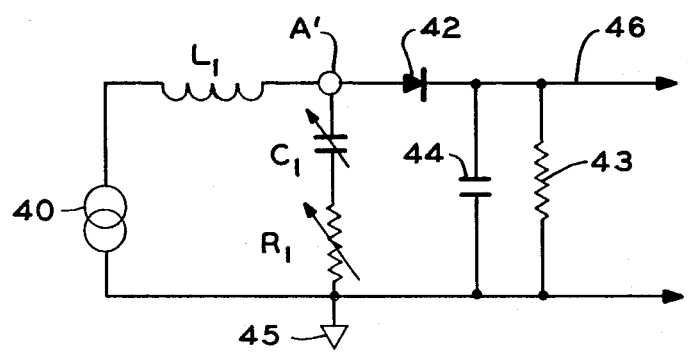
FIG. 4

FLUID FLOW SENSING SYSTEM

BACKGROUND OF THE INVENTION

1. Field of the Invention

The present invention relates generally to measuring the volumetric flow of a fluid through a passage and, more particularly, to a system for detecting the passage of a follower element motivated by the fluid in the passage.

2. Description of the Prior Art

In the prior art fluid flowmeters or the like are known which utilize a ball or other type follower element in a manner wherein the motion of the follower element is activated by the flow of the fluid medium such that the displacement of the follower element is related to the volumetric flow of the fluid. The path described by the follower element may be a closed circular path or the like in which the rate of rotation of the follower element is indicative of the flow of the fluid medium. Such a system is illustrated and described in U.S. Pat. No. 4,157,660 to Spacek issued June 12, 1979. A follower element may also be utilized to sense other conditions in a flowing fluid wherein the location or position of the follower element in the fluid is indicative of the condition to be sensed.

The movement of the follower element past a fixed location or the positioning of the follower element at a fixed location has been sensed optically. An example of this which uses a light emitting diode and receiver in conjunction with an opaque follower is disclosed in U.S. Pat. No. 4,089,220 issued to Houlburg May 6, 1978. It is known to use a ferromagnetic follower element which can be sensed, for example, by a system using a permanent magnet in cooperation with an induction coil to produce an induced current during the passage of the follower element. Other types of photoelectric or magnetic pick-up devices including electrodielectric devices have also been proposed.

Whereas the prior art follower sensing devices have been somewhat successful, they all contain certain drawbacks. Optical systems, of course, depend on the transparency of the fluid involved and cannot be used in many industrial applications where the fluid is turbid or opaque or where environmental dust or the like may interfere. Magnetic type sensors require the use of a ferromagnetic follower. The follower, however, may not be compatible with the fluid either in terms of specific gravity or may react chemically with the fluid of interest.

SUMMARY OF THE INVENTION

The present invention provides a system for detecting the presence of a follower element at one or more fixed points along a fluid conduit which overcomes many of the problems associated with prior art devices. The system takes advantage of changes in the electrical conductivity or capacitance properties of a volumetric path which are caused and emphasized by the presence of the follower element in the fluid. The follower element is chosen to have a dielectric constant and/or resistivity which is substantially different from that of the fluid. At least one sensor element is provided which may be in the form of an electrode which is electrically coupled with the fluid and includes a detector circuit which detects changes in conductance, and/or dielectric constant in a path through the fluid between the absence and presence of the follower element.

In one embodiment a single sensor is utilized in a series resonant AC circuit. That circuit includes a series inductor which, with the resistance and capacitance in the electrode circuit, forms a resonant circuit. Excitation for the circuit is supplied by a high frequency alternating current generator. A diode or similar device is used to detect a change in circuit output responsive to a change in either the volumetric capacitance or the resistance through the fluid produced by the passage or presence of a follower element. In another embodiment, a pair of electrodes are connected across a source of high frequency AC so that the fluid is in series with the AC source. A diode or other sensing device is utilized to detect a reduction of the level of high frequency excitation resulting from capacitance or resistance changes through the fluid path when it contains the follower element.

BRIEF DESCRIPTION OF THE DRAWINGS

In the drawings, wherein like numerals are utilized to designate like parts throughout the same:

FIG. 1A is a view of a conduit showing a follower element and a pair of sensors in accordance with one embodiment of the present invention;

FIG. 1B is an enlarged, cut-away view showing the mounting of one sensor of either of FIGS. 1 or 3;

FIG. 2 is a schematic electrical circuit diagram associated with the system of FIG. 1;

FIG. 3 is an illustration of an alternate embodiment of the system in accordance with the invention; and FIG. 4 is a schematic electrical circuit diagram of a circuit associated with the embodiment of FIG. 3.

DESCRIPTION OF THE PREFERRED EMBODIMENT

FIG. 1 depicts a dual-electrode embodiment of the present invention. A member 10, which may be a conduit or some type flowmeter body, has a hollow fluid passage 11 through which the fluid of interest is caused to flow. The fluid also contains one or more follower elements as at 12. A pair of sensing elements A and B, such as electrodes, are provided which are suitably insulated from the conduit body as at 13 and 14 and which may also be provided with a thin layer of face insulation between the sensing elements and the fluid as at 15 and 16.

A schematic electrical diagram showing a typical mode of follower detection in accordance with the embodiment of FIG. 1 is illustrated in FIG. 2. A source of high frequency alternating current, which may be a conventional oscillator circuit or other high frequency signal generator, is shown at 20. This is shown connected in series with the electrodes A and B. In this system, several modes of capacitance exist which are represented by the capacitors labelled C1, C2 and C3. The capacitance C1, represents the stray capacitance, from the electrode A to the conduit or chassis of the system represented by the chassis ground 21, through the molded insulation 13. A second mode of capacitance, represented by C2, exists from the electrode A through the insulation 13 and the fluid to the chassis as at 21. The third represented by C3 is the capacitance of electrode A through the thin face of molded insulation 15, the fluid and the thin face of the molded insulation 16 to the electrode B. The capacitances C1, C2, and C3 also represent the corresponding similar capacitances with respect to the electrode B, and thus are actually representative of each of these total capacities. The circuit also contains a series diode sensor 22 connected in conjunction with a filter circuit containing resistor 23 and capacitor 24. The circuit produces an envelope output at 25.

The detection system in accordance with FIGS. 1 and 2 is devised to detect the passage of the follower element 12 between the electrodes A and B. The follower element 12 is preferably made of a low dielectric material such as polystyrene when being utilized in a high dielectric fluid such as water, and is preferably made of a high dielectric material when being utilized in a low dielectric fluid such as oils or other petroleum products. If the system utilized consists of a ball-type flowmeter wherein the follower is a ball rotating about a circular or toroidal raceway, ideally, the density of the ball should be approximately equal to that of the fluid being measured. In addition, the diameter of the the ball should be such that only small clearances are required between the surface of the ball and the passage so that the ball is free to move with the fluid without hindrance.

In operation, each time the ball or other follower element is caused to pass in the raceway or conduit between the electrode pairs, a switch occurs in the effective dielectric constant when the ball displaces the fluid. Thus, for example, if water is the fluid, and a polystyrene ball is employed, a substantial change occurs because the dielectric constant of water is approximately 80 whereas the dielectric constant of polystyrene is in the order of 2.5. Even though the ball is spherical and the displacement of the water is never complete, the difference in dielectric constant is sufficient to be easily detected.

It can be readily appreciated that C3 and C2 constitute a capacity divider across C1. Thus, when the flowmeter element enters the space between the electrodes, the value of C3 changes substantially. In the example of water and polystyrene, the value of C3 changes downward and a reduction of the level of high frequency excitation occurs at the output terminal B to the chassis or ground. The level reduction is converted to a detected envelope by the diode 22 and the filter system consisting of the resistor 23 and capacitor 24. This, in turn, furnishes a negative going signal waveform at the envelope output 25. Conversely, if the fluid to be measured has a low dielectric constant and the follower element or ball has a high dielectric constant, the passage of the follower between the electrodes will cause a substantial increase in the level of the high frequency excitation between the output terminal B and the ground. This change is converted to the detected envelope by the diode and filter will furnish a positive going signal waveform at the envelope output. The system, of course, reacts to a change in capacitance or resistance, or both and by properly selecting the material or combination of materials for the follower, a great many different fluids can be measured.

An alternate configuration or embodiment is illustrated by FIGS. 3 and 4. FIG. 3 includes a flowmeter or other conduit 30, having follower element 31 in hollow passage 32. A single electrode, which may be similar to that of FIG. 1, is depicted at A', suitably insulated from the conduit body at 33 and having a thin insulating coating between the electrode and the fluid at 34. Thus, the basic arrangement is similar to that for the embodiment of FIG. 1 except that this embodiment need utilize but one electrode.

The associated circuitry is shown in the schematic electrial diagram of FIG. 4. This includes a conventional source of high frequency AC current 40 which may be a signal generator or oscillator circuit which provides an output of stable high frequency current. The source 40 is connected in series with an inductor $L_1$ and the single electrode A' and through a diode 42 having an associated filter network including resistor 43 and capacitor 44. The capacitance in the circuit between the electrode at A' and the chassis or ground 45 includes the capacitance through the insulation and the capacitance in the path through the fluid and is represented by the variable capacitor $C_1$. Likewise, the resistance of the circuit including the resistance in the path through the fluid is represented by the illustrated variable resistance R1. This circuit is essentially a series resonant circuit which includes L1, $C_1$ and R1. The circuit is excited by the single source, which may be, for example, a 300 kilohertz signal generator. Inductor L1 is preferably a high "high" inductor.

The diode 42, then, detects the voltage across series connected capacitor $C_1$ and resistor R1. In this manner, a change in either the capacitance $C_1$ or the resistance R1 will affect the detected voltage level at the diode 42. The polarity of the output pulse 46, of course, can be made negative going or positive going depending on which side of resonance the signal source is set in the frequency spectrum. The advantage of using a high "Q" inductor of L1 lies in the fact that the pulse amplitude will be substantially enhanced making the system more sensitive.

Although the circuit in accordance with the embodiment of FIGS. 3 and 4 requires an inductor in series with the signal generator, it requires but a single electrode in the detection system. In addition, the sensing system of the embodiment of FIGS. 3 and 4 is sensitive to both changes in system resistance, i.e. dissipation, and changes in capacitance. In conductive fluids or other solutions having high dielectric constants the dissipation factor or change in series resistance occasioned by the passage of the follower member may be far more significant than the change in capacitance. In other fluids having low dielectric constants such as oils, hydrocarbon based fluids and the like, the capacitance change is more significant. The sensing system in accordance with the embodiment of FIGS. 3 and 4, as is the case in regard to that of FIGS. 1 and 2, reacts to a change in the resistance or the capacitance, or both. Thus, it may be utilized in conjunction with almost any fluid sought to be measured.

It will readily be appreciated with regard to the output signal in either embodiment that the concept may be applied to a counter for counting rotations of a ball in a ball flowmeter in conjunction with a timer, or utilized in any other manner indicative of the parameter sought to be measured by the passage or presence of the follower element. Such applications are well-known and will be apparent to those skilled in the art. Whereas the follower element has been described with particular reference to a ball moving in a circular passage, it will also be appreciated that the sensor element can be in any desired shape so long as the cross section is similar to that of the passage through which it is moved.

It can, therefore, readily be seen from the above description that by means of the present invention there is provided a simple sensing system which requires relatively few circuit components and which allows a great deal of flexibility in selecting the combination of fluid and follower element which may be required to yield optimum performance.

The embodiments of the invention in which an exclusive property or right is claimed are defined as follows:

1. A system for detecting changes in the electrical resistance or capacitance of a volumetric path through a field occasioned by the passage of a follower element comprising:
    a hollow fluid passage adapted to conduct a fluid;
    a follower element in said fluid of similar cross sectional shape to that of the passage and of the size slightly smaller than said passage such that the follower element is free to move along said passage, said follower element having electrical properties different from said fluid;
    a single electrode current sensor disposed in said passage in electrical communication with said fluid;
    a source of high frequency AC current connected to said sensor;
    detector circuit means connected to said sensor which detects changes in the AC electrical signal from said sensor in the presence of said follower element wherein said detector circuit further comprises
    a series resonant circuit including said source of high frequency AC current connected in series with an induction means and capacitive and resistive means associated with the flow of an electrical signal from said sensor through said fluid;
    means for detecting the change in the electrical signal produced by a change in either said capacitance or resistance characteristics of said detector circuit.

2. System according to claim 1 wherein said means for detecting the change in the electrical signal is a diode means.

3. The system according to either of claims 1 or 2 wherein said induction means comprises a high "Q" inductor.

* * * * *